Oct. 1, 1963 R. J. GRILL ETAL 3,105,441
DUAL FLOW MEANS FOR GEAR FUEL PUMPS
Filed April 22, 1960 5 Sheets-Sheet 3
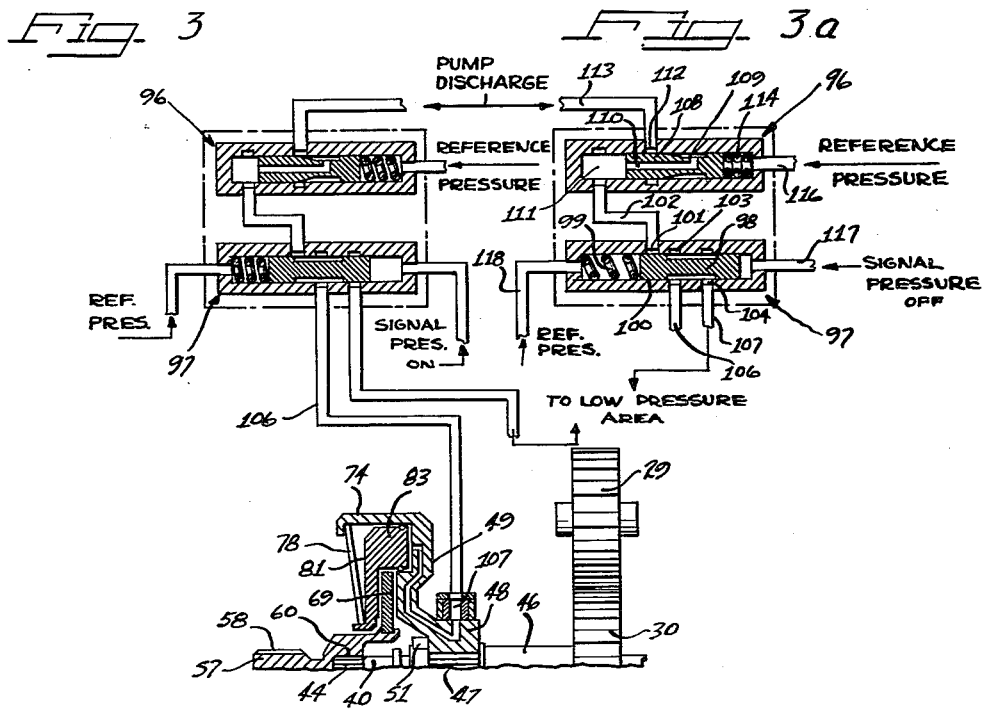
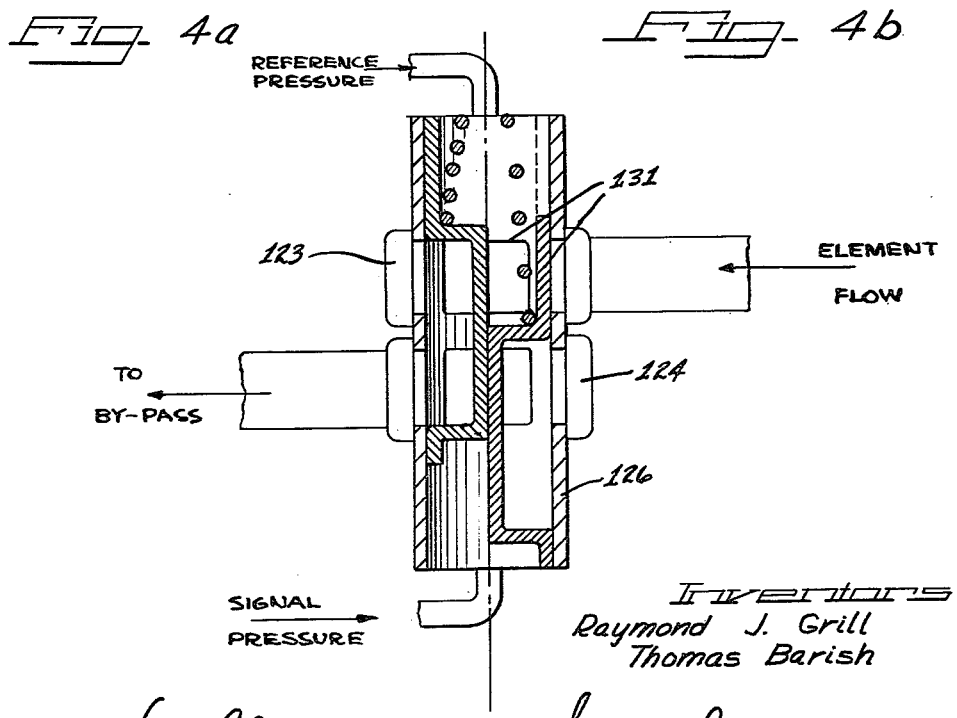
Inventors
Raymond J. Grill
Thomas Barish

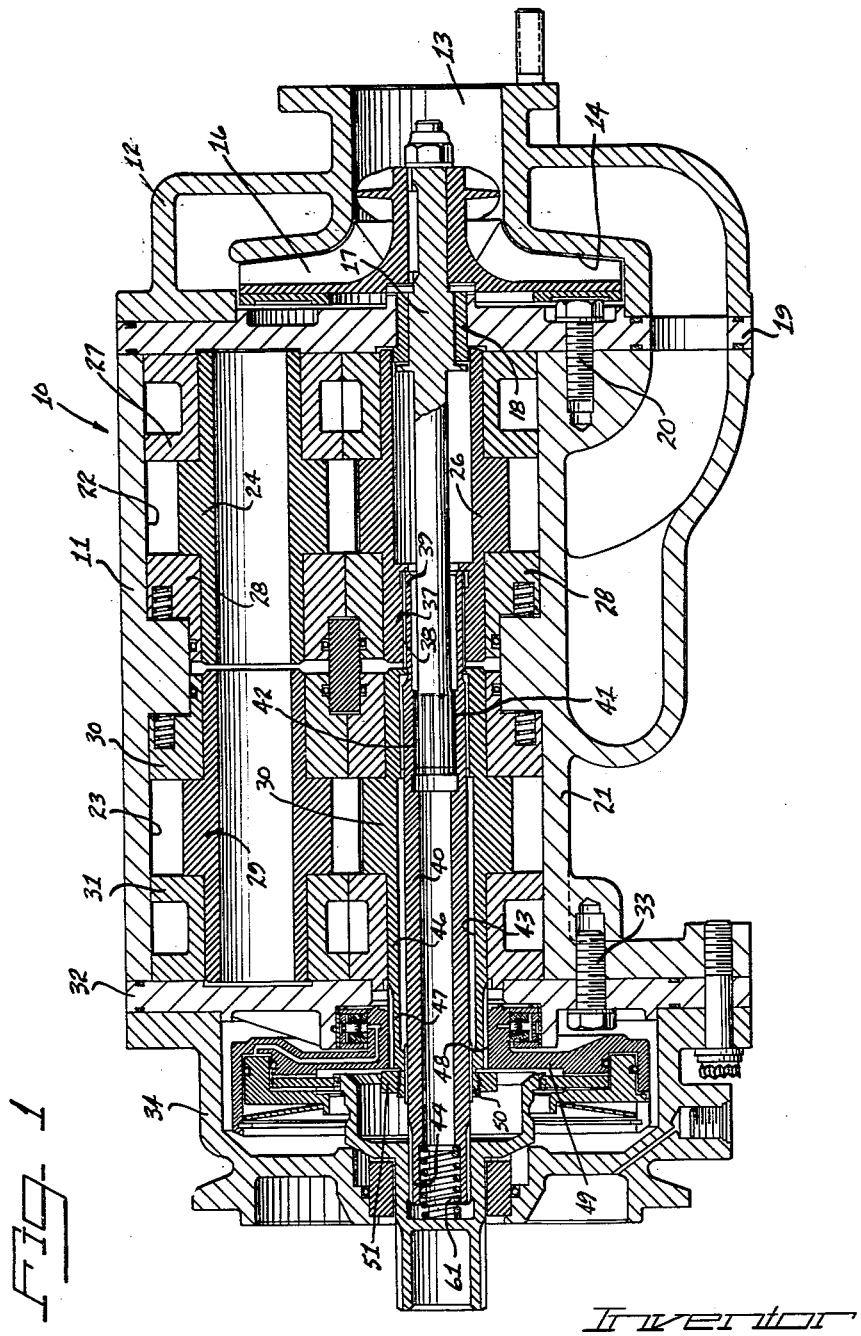

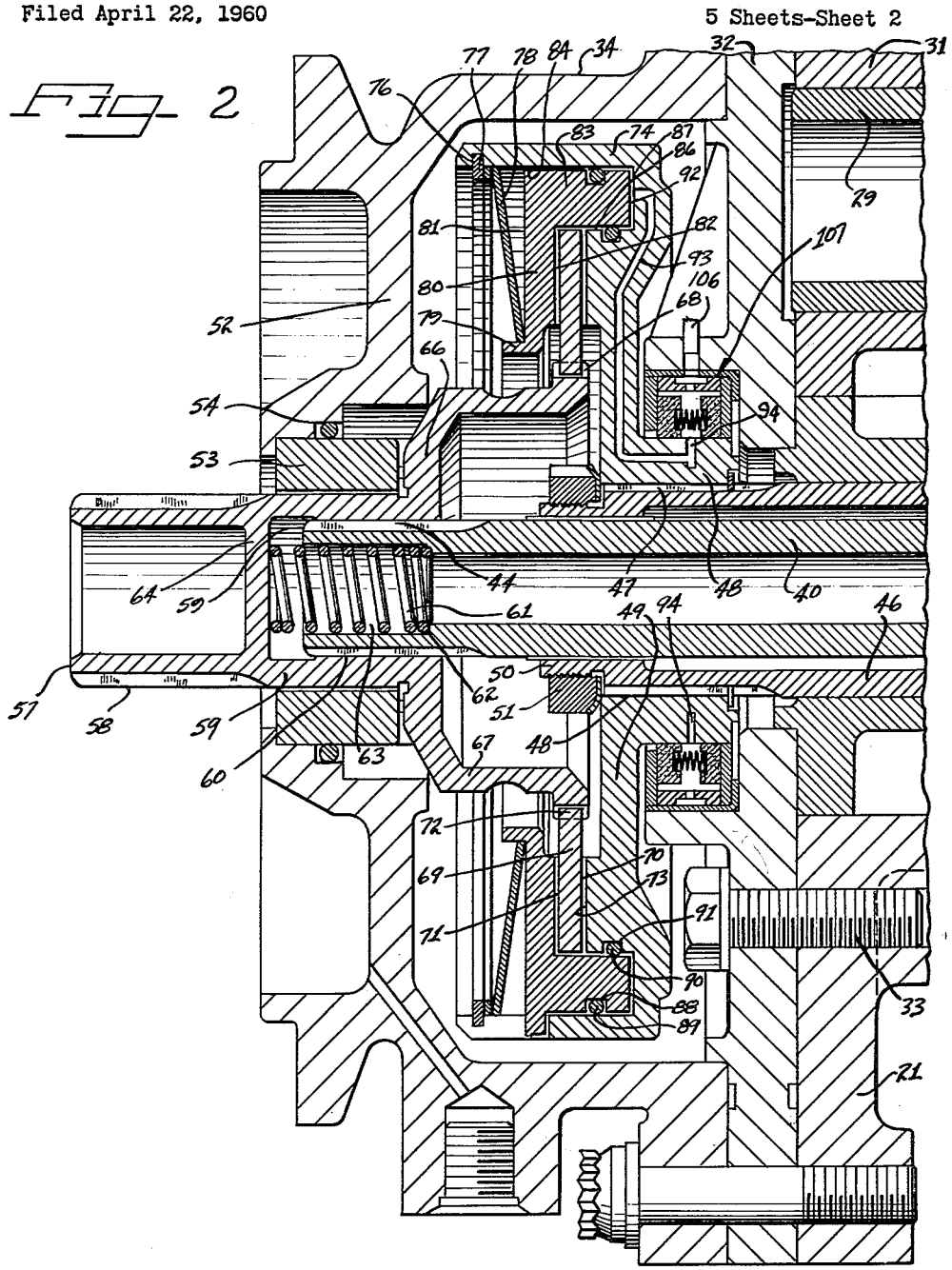

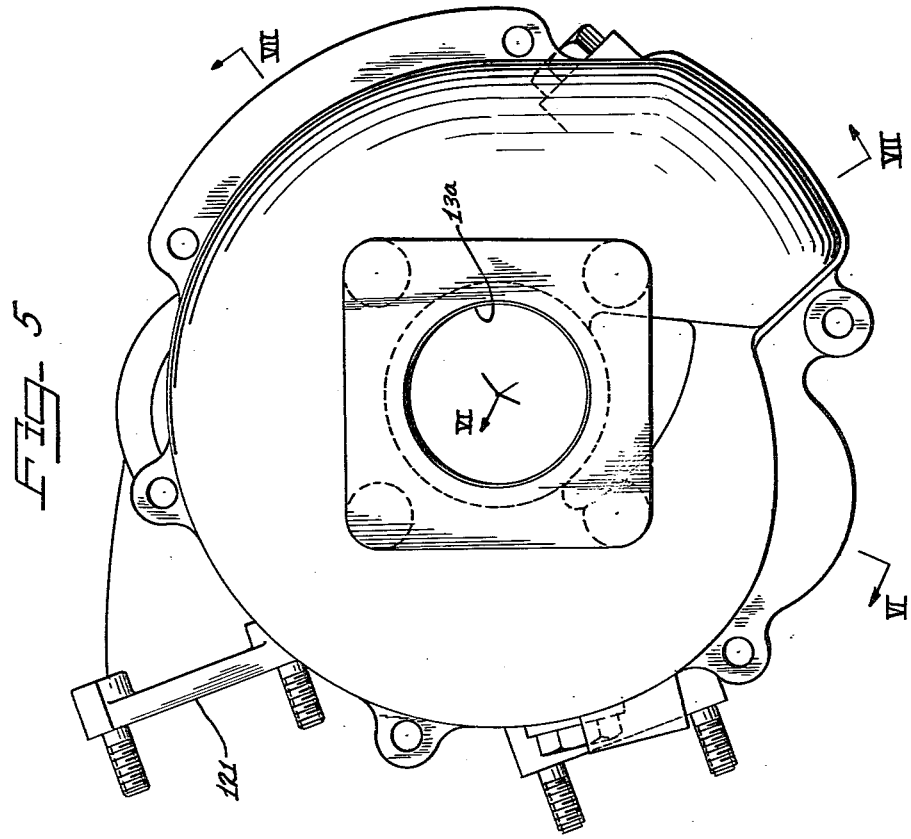
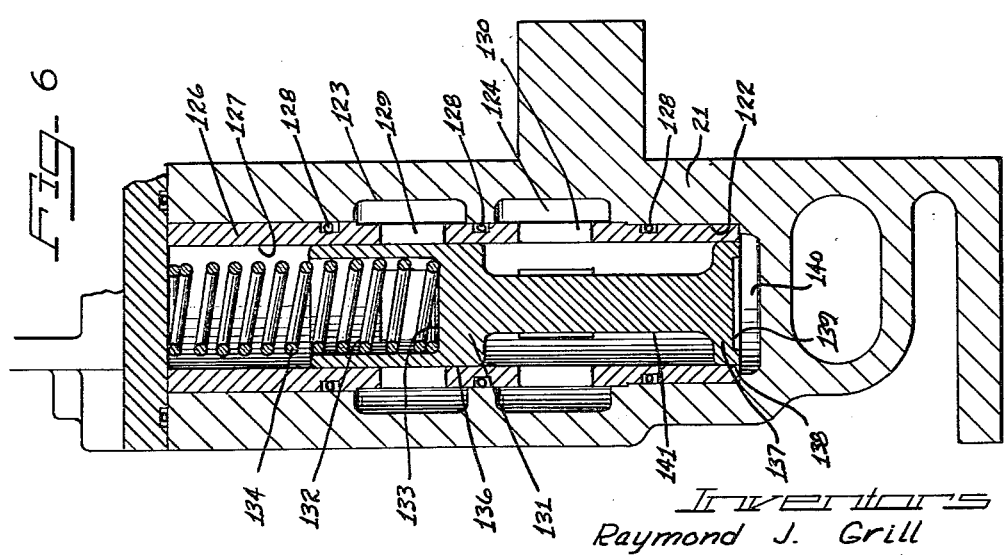

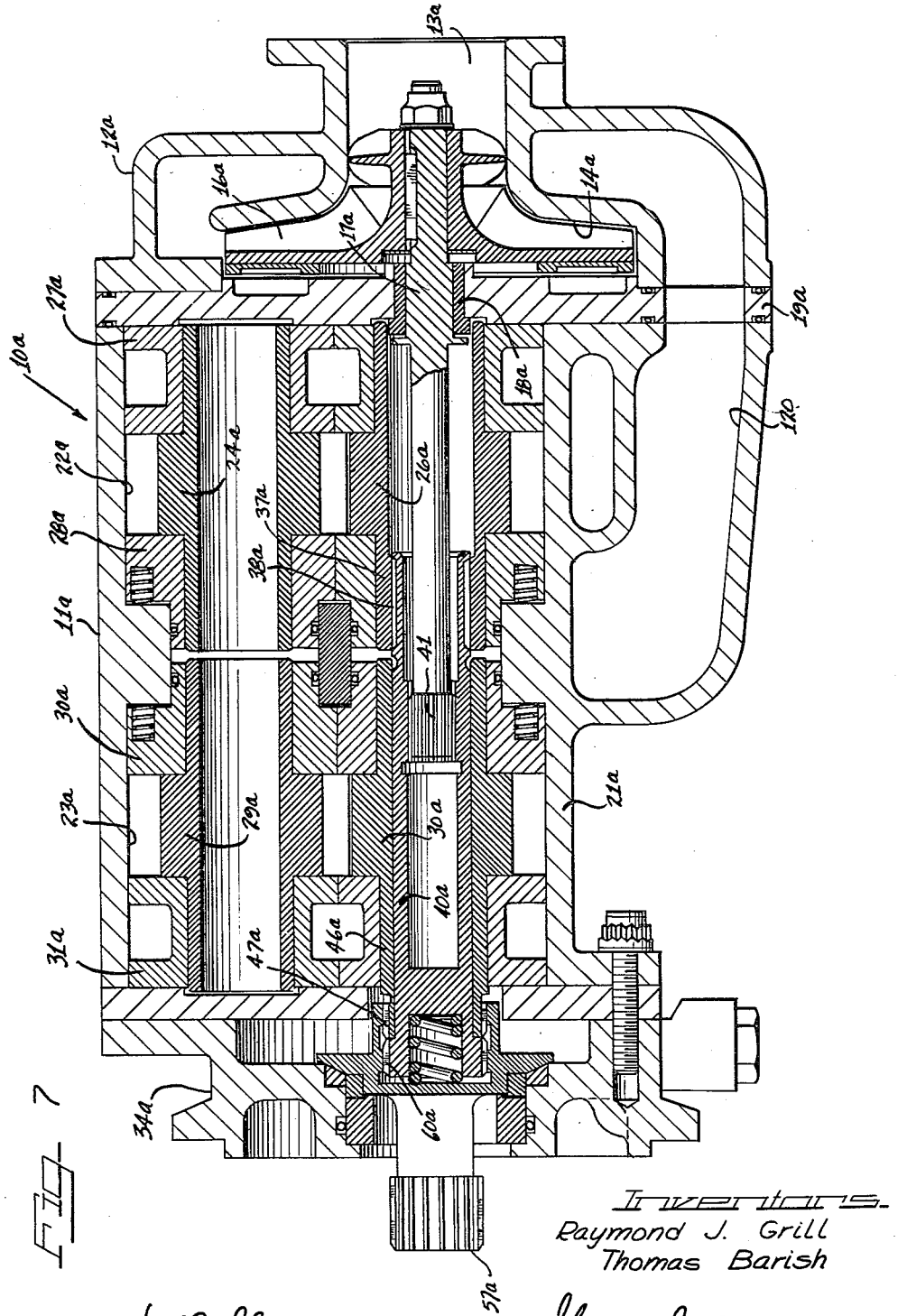

United States Patent Office 3,105,441
Patented Oct. 1, 1963

3,105,441
DUAL FLOW MEANS FOR GEAR FUEL PUMPS
Raymond J. Grill, Richmond Heights, and Thomas Barish, Shaker Heights, Ohio, assignors to Thompson Ramo Wooldridge Inc., Cleveland, Ohio, a corporation of Ohio
Filed Apr. 22, 1960, Ser. No. 24,038
9 Claims. (Cl. 103—11)

This invention relates generally to pumping apparatus and more particularly relates to improvements in pumps having multiple rotary fluid displacement means and wherein the power operating requirements of the pump and the delivery capacity of the pump may be selectively varied to more closely match demand requirements.

Although the principles of the present invention are of general utility, a particularly useful application of the pump apparatus disclosed herein is made to an aircraft fuel system. As is well known, fuel requirements vary widely in an aircraft fuel system because less fuel is required when the aircraft is cruising at high altitudes than during emergency periods, such as take-off or other operating conditions when high fuel system demand is placed on the fuel pumps.

The provision of efficient fuel pumping apparatus in an aircraft is further complicated by the limitations of space and weight. Accordingly, it is not practicable or feasible to provide pumping apparatus which in any manner duplicates so much of the pump as is necessary to meet maximum system demand, for example, such as might be suggested by the use of one pumping apparatus to supply fuel during conditions of low system demand and an entirely separate and independent pumping apparatus to supply fuel under operating conditions of high system demand.

In connection with this same problem, the provision of a high capacity pump which supplies more than fuel system requirements under low demand conditions such as a cruising condition at high altitude results in a large volume of fuel being recirculated through the fuel system. Every time the pump acts upon such fuel, the work performed on the fuel results in an increase in temperature, thereby greatly complicating the problems of fuel frothing and bubble formation.

In accordance with the principles of the present invention, there is provided a fuel pump which is particularly characterized by including multiple rotary fluid displacement means driven by a common driving means utilizing a friction clutch as a controllable means of providing selective dual flow or single flow operation.

It is further contemplated by the present invention to provide either in a multiple pump having the aforementioned clutching assembly, or in any other form of multiple pump an integral by-pass valve installed on the discharge side of only a single pumping element so that upon actuation only one single unit will be by-passed, thereby reducing the power required to drive the multiple pump and effecting a reduction of potential heat added to the fuel in the system.

It is an object of the present invention, therefore, to provide an improved pump utilizing a clutching apparatus.

Yet another object of the present invention is to provide an improved by-passing arrangement for a multiple pump.

A further object of the present invention is to provide a clutching mechanism utilizing hydraulic actuating means.

A further object of the present invention is to provide a clutch for a multiple pump wherein the clutch is actuated by pump-generated pressure.

Yet another object of the present invention is to provide a multiple gear pump having flow modulation on a positive half-flow basis.

Yet another object of the present invention is to provide a clutch-operated multiple pump incorporating a servo valve mechanism to regulate the actuation of the clutch by pump-generated pressure.

A still further object of the present invention is to provide a hydraulic clutch actuating mechanism for a multiple pump wherein pump discharge pressure is metered through a pressure-limiting valve, thereby giving positive clutch action which is not limited to the non-uniformity likely to exist in the use of a signal pressure alone.

Another object of the present invention is to provide a pump clutch actuated by pump-generated pressure and wherein minor leakages through the pressure plate arrangement of the clutch are rendered insignificant by automatic correction.

Still another object of the present invention is to provide a fluid operated clutch for a pump used for dual flow delivery or half-flow delivery wherein failure of the one pump unit utilized at half-flow will automatically institute actuation of the other pump unit.

Another object of the present invention is to provide a servo valve control mechanism for a pump clutch actuated by pump-generated pressure wherein any desired pressure can be maintained in the clutch area by minor variations in pressure valve design or setting.

Although other advantages and objects may be suggested by those versed in the art, it is believed such additional advantages and features will become manifest upon making reference to the detailed description which follows and the accompanying sheets of drawings in which preferred structural embodiments of a multiple pump construction incorporating the principles of the present invention is shown by way of illustrative example.

On the drawings:

FIGURE 1 is a cross-sectional view of an aircraft fuel pump incorporating a clutch construction in accordance with the principles of the present invention;

FIGURE 2 is an enlarged view similar to FIGURE 1 but showing only the details of the clutch mechanism;

FIGURE 3 is a schematic view of the control means provided in the pump of FIGURES 1 and 2 for regulating the operation of the clutch;

FIGURE 3a appears alongside FIGURE 3 to illustrate the different positions of the valve regulatory components in the arrangement of FIGURE 3 for a different operating condition;

FIGURE 4a and FIGURE 4b is a schematic composite view intended to show a by-pass valve provided in accordance with the principles of the present disclosure in open position on the left-hand side of the composite view identified as FIGURE 4a and in closed position on the right-hand side of the composite view, as shown in FIGURE 4b;

FIGURE 5 is an end elevational view of a multiple pump incorporating either the by-pass valve of FIGURES 4a and 4b, or the clutch mechanism of FIGURES 1 and 2, or both;

FIGURE 6 is a fragmentary cross-sectional view showing the by-pass valve taken on line VI—VI of FIGURE 5;

FIGURE 7 is a cross-sectional view taken on line VII—VII and shows the internal construction of a pump utilizing only the by-pass valve of FIGURE 6.

As shown o nthe drawings:

Referring to FIGURE 1, the pump of the present invention is shown generally at 10 and comprises a series of housing parts connected in firm assembly with one another to form a casing shown generally at 11. At one end of the casing 11, there is provided a housing part 12 in which is formed a pump inlet 13 and in which is also formed a volute pumping chamber 14 through which fluid is driven at increased pressure by a centrifugal impeller 16 carried on the end of a shaft 17 and journaled in a bearing 18 supported by a housing part 19.

The housing part 19 is connected by a plurality of fasteners 20 to an intermediate housing part 21 in which is formed two separate gear pumping chambers shown at 22 and 23, respectively.

In the pumping chamber 22 there is provided a driven gear 24 which meshes with a driver gear 26. Fixed bearing means 27 are provided at one side of the driver and driven gears 26 and 24 to journal the shaft extensions thereof and to seal against the adjoining gear side faces. On the opposite side of the gears, there is provided pressure-loaded end plate means shown generally at 28 which function to provide bearing support for the inwardly adjacent shaft extensions of the gears 24 and 26 and which are adapted to be pressure-loaded into sealing engagement with the adjoining side faces of the gears 24 and 26.

In the pumping chamber 23, there is provided a driven gear 29 which meshes with a driver gear 30. This gear pumping unit is likewise provided with pressure-loaded movable end plate means shown at 30 and which correspond in structure and function to the pressure-loaded end plate means 28. There is also provided fixed bearing means shown at 31 which correspond generally to the fixed bearing means 27.

At the other end of the housing part 21 there is provided a plate-like housing part 32 connected by a plurality of fasteners 33 to the housing part 21 and, in turn, carrying a mounting flange housing part shown generally at 34 and in which is housed the clutch mechanism of the present invention shown in enlarged detail in FIGURE 2 of the drawings.

It should be noted that the driver gear 26 has a gear shaft extension 37 which is internally splined as at 38, thereby to form a coupling connection with a similarly splined portion 39 of a quill shaft 40.

The shaft 17 is splined as at 41 to effect a coupling connection with the quill shaft 40 as at 42. The quill shaft 40 extends through the driver gear 30 of the other pump unit since the driver gear 30 is formed with a hollow shaft bore shown at 43. The end of the quill shaft 40 is splined as at 44 to form a coupling connection positioned within the mounting flange housing part 34.

The driver gear 30 has a shaft extension 46 formed thereon which projects beyond the fixed bearing means 31 and through the housing part 32 to form a splined coupling connection 47, thereby to effect a coupling connection with a similarly internally splined hub 48 formed on a pressure plate member 49 constituting one of the elements of the clutch assembly. The free end of the shaft extension 46 is threaded as at 50 and receives a lock nut 51 by means of which the pressure plate member 49 may be securely assembled to the shaft extension 46 in rigid co-rotatable assembly.

The mounting flange housing part 34 is formed with an end wall 52 having a counterbored center opening in which is received a bearing 53 mounted in sealed relation with the assistance of an O-ring 54 and journaling a stub end of a driving coupling member 57 formed with a splined coupling connection 58 which may be connected to a suitable source of driving power for the pump 10.

The driver coupling connection 57 is further provided with an internal recess 59 splined as at 60 to effect a coupling connection with the splined end portion 44 of the quill shaft 40, thereby to drive the driver gear 26 and rotate the gears 24 and 26 within the pumping cavity 22. A loading spring 61 is bottomed against a shoulder 62 formed in a recess 63 at one end of the quill shaft 40, the opposite end of the spring 61 being bottomed against an internal abutment means 64 provided by a wall formed in the coupling connector 57.

The coupling connector member 57 is further provided with a radially outwardly extending wall 66 inwardly of the bearing 53 and terminating in an axial flange 67 spaced radially outwardly of the quill shaft 40 as well as the shaft extension 46.

The outer peripheral surface of the flange 67 is formed with a circumferentially extending splined portion 68 to which is connected a clutch disk or friction disk 69 having a clutch face 70 on one side thereof, and a clutch face 71 on the opposite side thereof. The friction disk 69 is internally splined as at 72, thereby to effect corotatable connection with the driving coupling member 57, but allowing limited axial movement of the disk 69 with respect to the coupling member 57 within the limits prescribed by the splined portion 68 and the splined portion 72.

The pressure plate member 49 is formed with an annular clutching surface 73 adjacent the clutching surface 70 of the disk 69 and engageable therewith.

The pressure plate 49 is further characterized by the formation thereon of a flange 74 spaced radially outwardly of the friction disk 69 and extending axially beyond the disk 69 in concentrically spaced relation relative to the flange 67 on the driving coupling member 57.

The flange 74 has an internal recess 76 in which is received an abutment means such as a snap ring 77, thereby to bottom one end of a compression spring shown at 78. The opposite end of the compression spring 78 is received and confined between a hub 79 and a radially outwardly extending wall 80 of a second pressure plate member indicated generally at 81. The pressure plate member 81 is provided with an annular clutching surface 82 which confronts the clutching surface 71 on the disk 69 and is engageable therewith. The wall 80 terminates in an axial extending flange 83 which is sized and shaped to be slidably received within a generally cylindrical bore 84 formed by the flange 74.

In this regard, it should be noted that the pressure plate member 49 has an annular wall 86 spaced inwardly of the flange 74 and which together with the bore wall 84 and a bottom wall 87 forms an annular recess to establish a piston and cylinder relation with the flange 83 of the second pressure plate member 81.

To improve the sealing relation, the outer peripheral surface of the flange 83 is recessed as at 88 to receive a sealing member 89 engageable with the bore wall 84, while the inner peripheral recess of the flange 83 is engaged by a sealing member 90 carried in a recess 91 formed in the wall 86 of the pressure plate member 49.

Thus, the end wall 92 on the flange 83 forms together with the pressure plate member 49, a pressure control chamber and constitutes a motive surface which, when loaded with fluid under pressure, will impose an axial thrust force against the pressure plate member 81 to move the same axially against the bias of the spring 78.

The spring 78 axially preloads the pressure plate member 81 towards the friction disk 69, thereby engaging the clutching surface 82 against the clutching surface 71 and urging the friction disk 69 into engagement with the pressure plate member 49 so the clutching surface 70 will engage the clutch surface 73. Thus, under normal preloaded conditions, the clutch mechanism will render the pressure plate member 49 corotatable with the driving coupling member 57 and hence both the quill shaft 40 and the shaft extension 46 will be simultaneously rotated so that both of the sets of gears 24, 26 and 29, 30 will be simultaneously rotated to produce a dual flow pumping action.

Whenever it is desired to halve the flow of the pump, the pressure plate member 81 is backed off from the disk 69 by moving the same axially against the bias of the spring 78, thereby disengaging the clutching surfaces 70 and 73, whereupon the driving coupling member 57 will continue to drive the gear pump unit 24, 26 through the quill shaft 40, however, the gear pump unit 29, 30 will stop so that only one pump unit will be discharging fuel to the common outlet of the multiple pump assembly.

In order to effect operation of the clutching means hydraulically and automatically, there is formed in the pressure plate member 49 a flow passage 93 which intersects the bottom wall 87 opposite the motive surface 92 and which passage 93 terminates in a circumferentially extending continuous recess 94 formed in the hub portion 48 of the pressure plate member 49.

When pumps of the type described herein are incorporated in aircraft fuel systems, a clutching action requirement can be expected at a pump input speed of upwards of 5000 r.p.m. Accordingly, the friction disk clutch arrangement described above permits momentary slipping for cushioning of inertial forces at such speeds. The slip during engagement permits the load to be coupled and accelerated smoothly within a period of several seconds thus preventing excessive torsional stresses on the pumping system.

During dual flow operation, torque is transmitted since the friction disk and the pressure plates are held in contact by the compression spring and the clutch is in a normally engaged position. When half flow operation is required, pressure is introduced through the pressure plate member 49 to the cylinder forcing the plates to separate and permitting disengagement of the clutch.

Fuel pressure necessary to disengage the clutch for half flow operation is bled from pump discharge. The use of pump generated discharge pressure provides forces in the magnitude required to actuate the clutch, but does not compromise pump performance. It is also contemplated in accordance with the provisions of the present invention to eliminate the direct use of signal pressure for actuating the clutch resulting in negligible leakage from the signal pressure source.

The control system which permits pressurization of the clutch is shown schematically in FIGURES 3 and 3a and consists of a pressure-limiting valve 96 and a servo transfer valve 97. These two valves 96 and 97 are actually combined to form a composite unit in actual use, however, for purposes of convenience in illustration, they are shown separately on the schematic diagrams of FIGURE 3 and FIGURE 3a. In FIGURE 3a, both of the valves 96 and 97 are shown in the normally closed position when the clutch is in the normally engaged position.

In FIGURE 3a, the servo transfer valve 97 is shown as comprising a spool valve member 98 biased by a coil spring 99 so that a land 100 closes an annular recess 101 communicating with a passage 102 leading to the pressure limiting valve 96. In this same position, two annular passages 103 and 104 communicating respectively with a passage 106 and a passage 107 are open to one another thereby interconnecting the passages 106 and 107.

The passage 106 is connected to the annular recess 94 by means of a gland assembly shown at 107 and thus when communicated with the passage 107 will allow the pressure in the clutch cylinder to dissipate since the passage 107 is ported to a low pressure pump interstage area.

The pressure relief valve 96 has a land 108 formed with a metering recess 109 communicating via an internal passage 110 to a recess 111 connected to the passage 102. The land 108 controls a port 112 connected to a passage 113 leading to pump discharge. The pressure force acting on the valve urges the valve against the coil spring 114 and against reference pressure referenced to the end of the pressure-limiting valve by the passage 116.

When half flow operation is required, a signal pressure of some predetermined quantum over a selected reference pressure energizes the servo transfer valve 97 via a passage 117, thereby moving the valve member 98 against the bias of the spring 99 and against the reference pressure supplied to the servo transfer valve via the passage 118, whereupon the servo transfer valve 97 will assume the open position shown in FIGURE 3.

Immediately, fuel at pump discharge pressure is bled into the pressure-limiting valve 96 and is metered via the passage 113, the port 112, the passage 109, 110, 111 and into the passage 102 for delivery via the servo transfer valve to the passage 106, thereby to actuate the clutch pressure plate 81 to disengaged position.

When full flow operation is again required, the absence of signal pressure deenergizes the servo transfer valve allowing the valve piston to close the ports restricting the flow of fuel to the passage 106, whereupon the passage 106 is again interconnected with the passage 107 allowing the pressure in the clutch cylinder to dissipate, whereupon the compression spring 78 forces the pressure plates 81 and 49 into engagement with the disk 69.

The control system thus provided, which utilizes pump discharge pressure to actuate the clutch to the disengaged position, produces a fail-safe interlocking feature for the clutch. In the event of the absence of discharge pressure due to a failure of the primary pumping element during half flow operation, the clutch automatically engages the secondary pumping element.

By utilizing the pressure-limiting valve 96 which moves with signaled discharge pressure, minor leakages through the pressure plate clutch are insignificant as correction is automatic. Moreover, since the use of signal pressure alone might lack uniformity, it will be apparent that the use of any desired pressure in the clutch area by minor variations in the pressure valve design or setting within the pressure-limiting valve affords great flexibility while the availability of full pump discharge pressure insures positive clutch action. Moreover, the fail-safe feature insures that failure of the pump unit 24, 26 at half-flow operation results in the pump unit 29, 30 automatically coming into action.

In accordance with the principles of the present invention, by-pass means can be provided as an alternative arrangement for reducing pump delivery and reducing pump power requirements. Since the utilization of such by-pass valve means could be in a pump, as shown in FIGURE 1, or in any other form of multiple pump not utilizing a clutch construction, a multiple pump without a clutch is shown in FIGURE 7 which is generally similar to the pump of FIGURE 1 and is, therefore, provided with reference numerals similar to the reference numerals already used but bearing the suffix a. Thus, the pump 10a has a casing indicated generally at 11a including a plurality of connected-together housing parts. The housing part 12a supplies an inlet 13a and a volute pumping chamber 14a in which is rotated a centrifugal impeller 16a carried on a shaft 17a journaled in a bearing 18a carried in a housing part 19a connected to an intermediate housing part 21a. Formed within the housing part 21a is a first pumping chamber 22a and a second pumping chamber 23a. A driven gear 24a meshes with a driver gear 26a in the pumping chamber 22a, while a driven gear 29a meshes with a driver gear 30a in the pumping chamber 23a.

Fixed bearing means shown at 27a and 31a are provided on one side of each set of gears, while pressure-loaded movable end plate means shown at 30a and 28a are provided on the opposite sides of each set of gears.

In the arrangement of FIGURE 7, the shaft 17a is splined to a quill shaft 40a as at 41, while the quill shaft 40a is splined to a shaft extension 37a as at 38a.

A driver coupling member 57a is journaled in a housing part 34a and has two internal splined portions effecting a coupling connection with the quill shaft 40a as at 60a and to a shaft extension 46a as at 47a. Thus, all of the pumping means of the pump 10a are driven in common from the driving coupling member 57a and in operation fluid is drawn from a supply source through the inlet 13a, whereupon it is pressurized by the centrifugal impeller 16a and discharged from the volute pumping chamber 14a into the interior of the casing part 21a via a passage 120 forming a common inlet for both of the gear pump units 24a, 26a and 29a, 30a.

The gear pump units being in series with the centrifugal impeller or inducer stage, further pressurize the fluid and discharge the same through a common outlet shown in FIGURE 5 at 121.

In accordance with the principles of the present invention, a by-pass valve is installed on the discharge side of one gear element so when actuated, the pressure rise through the gear stage will be automatically reduced, thereby reducing the power required to drive the pump.

For example, as applied in a pump incorporating the structural and functional features herein described and rated to operate at 600 p.s.i. discharge pressure, it is estimated that one element will require an input of 28.8 horsepower, and will add 180 B.t.u./minute to the system. The same element by-passed through the by-pass valve of the present invention, will require an input of 7.8 horsepower, while liberating only 50 B.t.u./minute to the system. Thus, the by-pass valve of the present invention offers advantages not only in the reduction of power required to drive the pump but also in the reduction of the potential heat added to the system.

The transfer valve of the present invention consists of a sliding piston and a sleeve, actuated by a signal pressure in one direction and a spring return in the other. Flow into the valve is from an annulus in the main housing through a plurality of spaced ports in the sleeve, for example, three equally spaced ports. Under high pump discharge pressures the valve remains radially balanced and free to move axially. When in operation, fluid flow enters the sleeve through the ports as soon as they are uncovered by the piston. Flow through the sleeve is in an axial direction to a second series of ports that are connected through a second annulus to the gear stage inlet line. The flow which is returned to the inlet is well mixed with primary stage flow in order to maintain stable temperature levels.

Upon a decrease of signal pressure, the balancing spring functions to move the piston axially, thereby closing the ports in the sleeve and stopping flow. Leakage is controlled by the fit of the piston in the sleeve. Such an arrangement is shown schematically in FIGURE 4a and FIGURE 4b, wherein FIGURE 4a shows the piston positioned in the open position and FIGURE 4b shows the piston positioned in the closed position. The actual structural embodiment of the valve in the pump 10a is shown in FIGURE 6. Thus, the casing part 21 is shown formed with a recess 122 having a pair of axially spaced enlarged annular ports 123 and 124. The annular port 124 communicates with a suction area receiving fluid from the common inlet passage 120 for one of the gear pump units, for example, the gear pump unit 24a, 26a, while the annular port 123 communicates with the pressure area of the same pump unit and hence with the common outlet port 121.

A sleeve 126 providing a valve bore 127 is inserted into the recess 122 and has three spaced annular recesses each receiving an O-ring 128 adapted to seal the ports 123 and 124 apart from one another.

Opposite the port 123, the sleeve 126 is formed with a plurality of circumferentially spaced openings such as three openings 129, while opposite the port 124 the sleeve is formed with a plurality of circumferentially spaced openings, for example, three ports 130.

A piston or spool 131 is axially slidable within the valve bore 127. At one end of the piston there is formed a recess 132 having a bottom wall 133 against which is bottomed one end of a coil spring 134. The opposite end of the coil spring 134 is engaged against an adjoining housing part closing the recess 122.

The external peripheral surface of the piston or spool 131 has a control land 136 formed thereon and in the position shown in FIGURE 6 the openings 129 and hence the port 123 is closed.

The end of the piston or spool 131 is also formed with a head portion 137 having a peripheral surface 138 which slidably engages the valve bore 127 and further providing on the end thereof a motive surface 139 which forms the movable wall of a recess 140 at the end of the valve bore 127 to which is supplied pump-generated pressure constituting a signal pressure.

Between the head portion 137 and the control land 136, the peripheral surface of the piston or spool 131 is provided with an annular recess 141. Accordingly, when actuated by signal pressure acting against the motive surface 139 against the bias of the spring 134, the land 136 will uncover the openings 129 and the port 123 will be placed in communication with the port 124, thereby by-passing the flow from the gear unit 24a, 26a.

Although minor modifications might be suggested by those versed in the art, it should be understood that we wish to embody within the scope of the patent warranted hereon all such modifications as reasonably and properly come within the scope of our contribution to the art.

We claim as our invention:

1. A pump comprising a casing having two separate gear pumping chambers formed therein, a first set of driver and driven gears in one of said pumping chambers and having a shaft element projecting axially outwardly of one end of said casing, a second set of driver and driven gears in the other of said pumping chambers and having a hollow shaft extension surrounding said shaft element and projecting out of said one end of said casing, a mounting flange housing part connected to said one end of said casing, a driving coupling member journaled in said housing part having a coupling connection outside of said housing part for connection to a source of driving power and having formed inside of said housing part a coupling connection with said shaft element, thereby to rotatably drive said first set of gears, said driving coupling member having an axially movable friction disk corotatably mounted on the outer peripheral portions thereof, a first pressure plate member on one side of said friction disk having a center hub portion formed with a driving connection with said shaft extension, thereby to drive said second set of gears whenever said first pressure plate and said friction disk are operatively connected with one another, said first pressure plate member having a peripheral flange spaced radially outwardly of said friction disk and extending axially beyond said friction disk to form a cylinder, a compression spring bottomed in said flange on the other side of said disk, a piston means in said cylinder engaged at one side with said spring and being biased thereby against said friction disk to normally lock said disk and said plate in clutched relation for dual flow pump operation, and means to move said piston means against said spring to disengage said disk and said plate member for half-flow pump operation.

2. A pump comprising a casing having two separate gear pumping chambers formed therein, a first set of driver and driven gears in one of said pumping chambers and having a shaft element projecting axially outwardly of one end of said casing, a second set of driver and driven gears in the other of said pumping chambers and having a hollow shaft extension surrounding said shaft element and projecting out of said one end of said casing, a mounting flange housing part connected to said one end of said casing, a driving coupling member journaled in said housing part having a coupling connection outside of said housing part for connection to a source of driving power and having formed inside of said housing part a coupling connection with said shaft element, thereby to rotatably drive said first set of gears, said driving coupling member having an axially movable friction disk corotatably mounted on the outer peripheral portions thereof, a first pressure plate member on one side of said friction disk having a center hub portion formed with a driving connection with said shaft extension, thereby to drive said second set of gears whenever said first pressure plate and said friction disk are operatively connected with one another, said first pressure plate member having a peripheral flange spaced radially outwardly of said friction disk and extending axially beyond said friction disk to form a cylinder, a compression spring bottomed in said flange on the other side of said disk, a piston means in said cylinder engaged at one side with said spring and being biased thereby against said friction disk to normally lock said disk and said plate in clutched relation for dual flow pump operation, said piston means having a motive surface formed thereon spaced from an adjoining end wall of said pressure plate member to form together therewith a pressure control chamber, and means communicating pump-generated pressure to said pressure control chamber to move said piston means against said spring and disengage said disk and said plate member for half-flow operation of the pump.

3. A pump comprising a casing having two separate gear pumping chambers formed therein, a first set of driver and driven gears in one of said pumping chambers and having a shaft element projecting axially outwardly of one end of said casing, a second set of driver and driven gears in the other of said pumping chambers and having a hollow shaft extension surrounding said shaft element and projecting out of said one end of said casing, a mounting flange housing part connected to said one end of said casing, a driving coupling member journaled in said housing part having a coupling connection outside of said housing part for connection to a source of driving power and having formed inside of said housing part a coupling connection with said shaft element, thereby to rotatably drive said first set of gears, said driving coupling member having an axially movable friction disk corotatably mounted on the outer peripheral portions thereof, a first pressure plate member on one side of said friction disk having a center hub portion formed with a driving connection with said shaft extension, thereby to drive said second set of gears whenever said first pressure plate and said friction disk are operatively connected with one another, said first pressure plate member having a peripheral flange spaced radially outwardly of said friction disk and extending axially beyond said friction disk to form a cylinder, a compression spring bottomed in said flange on the other side of said disk, a piston means in said cylinder engaged at one side with said spring and being biased thereby against said friction disk to normally lock said disk and said plate in clutched relation for dual flow pump operation, said piston means having a motive surface formed thereon spaced from an adjoining end wall of said pressure plate member to form together therewith a pressure control chamber, and means communicating pump-generated pressure to said pressure gears whenever said first pressure plate and said friction disk are operatively connected with one another, said first pressure plate member having a peripheral flange spaced radially outwardly of said friction disk and extending axially beyond said friction disk to form a cylinder, a compression spring bottomed in said flange on the other side of said disk, a piston means in said cylinder engaged at one side with said spring and being biased thereby against said friction disk to normally lock said disk and said plate in clutched relation for dual flow pump operation, said piston means having a motive surface formed thereon spaced from an adjoining end wall of said pressure plate member to form together therewith a pressure control chamber, said casing having an inlet and an outlet for said pump, means forming a flow path between said outlet and said pressure control chamber, and valve means in said flow path to regulate the actuation of said clutch with pump-generated presure.

4. A pump as defined in claim 3, said valve means including a normally closed pressure-limiting valve and a servo transfer valve responsive to a signal pressure to open said flow path.

5. A multiple pump comprising a casing having an inlet and an outlet, two separate pumping units moving fluid from the inlet to the outlet, a common driving means for driving said two pumping units including a pressure operated clutch for selectively inactivating one of said pump units to halve the flow of the multiple pump, and control means for said clutch comprising means in said casing forming a first flow passage to said clutch for conducting fluid at clutch actuating pressure thereto, a servo valve in said first flow passage preloaded to a first position wherein said flow passage is communicated to a low pressure pump interstage area, thereby allowing pressure in the clutch to dissipate and insuring operation of said one of said pump units, means in said casing forming a second flow passage from said outlet to said servo valve, said servo valve being responsive to a signal pressure and controlling the flow of fluid from said outlet to said clutch upon actuation thereof, and a pressure-limiting valve in said second flow passage comprising a spring-loaded valve member having a metering orifice formed therein through which all fluid flowing through said second flow passage passes, whereby any desired pressure may be maintained at the clutch for actuation purposes.

6. In a pump, a casing having plural rotary fluid displacement means and a common driving means therefor including a clutch, said clutch comprising a friction disk rotatable with said common driving means, a pair of pressure plates providing clutching surfaces on opposite sides of said disk and including means forming a pressure control chamber in which one of said pressure plates is axially movable, a preloading spring loading said one plate to movably engage said clutching surfaces, the other of said plates having a center hub portion having inner and outer peripheral portions, coupling means on one of said peripheral portions to couple said other of said plates for rotation with one of said plural rotary fluid displacement means, said other of said plates having a flow passage formed therein to receive fluid from a control means, thereby to operate said clutch hydraulically, an annular recess in the other of said peripheral portions of said hub and intersected by said flow passage, and gland means in said casing engaging said other peripheral portion of said hub to communicate fluid at pump generated pressure into said annular recess during rotation thereof for actuation of said clutch, means in said casing forming a first flow passage to said gland means for conducting fluid at clutch actuating pressure, a servo valve in said first flow passage preloaded to a first position wherein said flow passage is communicated to a low pressure pump interstage area, thereby allowing pressure in the clutch to dissipate whereby only one of said rotary fluid displacement means connected to said driving means, means in said casing forming a second flow passage from a pump discharge area to said servo valve, said servo valve controlling flow of fluid from said pump discharge area to said gland means upon actuation thereof, whereby said one of said plural rotary fluid displacement means connected to said clutch will operate.

7. In a pump, a casing having plural rotary fluid displacement means and a common driving means therefor including a clutch, said clutch comprising a friction disk rotatable with said common driving means, a pair of pressure plates providing clutching surfaces on opposite sides of said disk and including means forming a pressure control chamber in which one of said pressure plates is axially movable, a preloading spring loading said one plate to movably engage said clutching surfaces, the other of said plates having a center hub portion having inner and outer peripheral portions, coupling means on one of said peripheral portions to couple said other of said plates for rotation with one of said plural rotary fluid displacement means, said other of said plates having a flow passage formed therein to receive fluid from a control means, thereby to operate said clutch hydraulically, an annular recess in the other of said peripheral portions of said hub and intersected by said flow passage, and gland means in said casing engaging said other peripheral portion of said hub to communicate fluid at pump generated pressure into said annular recess during rotation thereof for actuation of said clutch, means in said casing forming a first flow passage to said gland means for conducting fluid at clutch actuating pressure, a servo valve in said first flow passage preloaded to a first position wherein said flow passage is communicated to a low pressure pump interstage area, thereby allowing pressure in the clutch to dissipate, whereby said rotary fluid displacement means connected to said driving means will operate, means in said casing forming a second flow passage from a pump discharge area to said servo valve, said servo valve controlling flow of fluid from said pump discharge area to said gland means upon actuation thereof, and a pressure limiting valve in said second flow passage comprising a spring loaded valve having a metering orifice formed therein through which fluid from the pressure discharge area is metered to maintain any desired pressure at the clutch for actuation purposes.

8. A multiple pump comprising a casing having plural rotary fluid displacement means for pumping fluid from inlet means to outlet means and a common driving means therefor including a clutch, said clutch comprising a friction disk rotatable with said driving means, a pair of pressure plates providing clutching surfaces on opposite sides of said disk and including means forming a pressure control chamber in which one of said pressure plates is axially movable, a preloading spring loading said one plate to movably engage said clutching surfaces with said friction disk, the other of said plates having a center hub portion having inner and outer peripheral portions, coupling means on one of said peripheral portions adapted to couple said other of said plates for rotation with a rotary fluid displacement means, said other of said plates having a flow passage formed therein, control means supplying fluid at pump-generated pressure, thereby to operate said clutch hydraulically, said control means comprising an annular recess in the other of said peripheral portions of said hub and intersected by said flow passage, and gland means in said casing engaging said other peripheral portion of said hub to communicate fluid at pump-generated pressure into said annular recess during rotation thereof for actuation of said clutch.

9. A multiple pump comprising a casing, plural rotary fluid displacement means in said casing for pumping fluid from inlet means to outlet means and a driving means including a clutch comprising a friction disk, a pair of pressure plates providing a clutching surface on each side of said disk, and means forming a pressure control chamber in which one of said plates is axially movable, a preloading spring loading said one plate to normally engage said clutching surfaces with the friction disk, the other of said plates having a flow passage formed therein, control means supplying fluid at pump-generated pressure to said flow passage, thereby to hydraulically operate said clutch selectively, and means for connecting said clutch to one of the rotary fluid displacement means.

References Cited in the file of this patent

UNITED STATES PATENTS

| | | |
|---|---|---|
| 2,094,449 | Forichon | Sept. 28, 1937 |
| 2,386,275 | Sigmund et al. | Oct. 9, 1945 |
| 2,413,081 | Shaeffer | Dec. 24, 1946 |
| 2,464,144 | McConaghy | Mar. 8, 1949 |
| 2,593,521 | Ball | Apr. 22, 1952 |
| 2,758,547 | Wendell et al. | Aug. 14, 1956 |
| 2,781,727 | Marshall | Feb. 19, 1957 |
| 2,806,430 | Osborne | Sept. 17, 1957 |
| 2,865,302 | Murray | Dec. 23, 1958 |
| 2,887,060 | Adams et al. | May 19, 1959 |
| 2,918,011 | McCray et al. | Dec. 22, 1959 |
| 2,944,597 | Wilson | July 12, 1960 |
| 2,946,790 | Corbett | July 26, 1960 |